May 25, 1965　　　J. D. MAFFEI　　　3,184,902
BEAN POD STRIPPER
Filed Feb. 7, 1962　　　　　　　　　　5 Sheets-Sheet 1
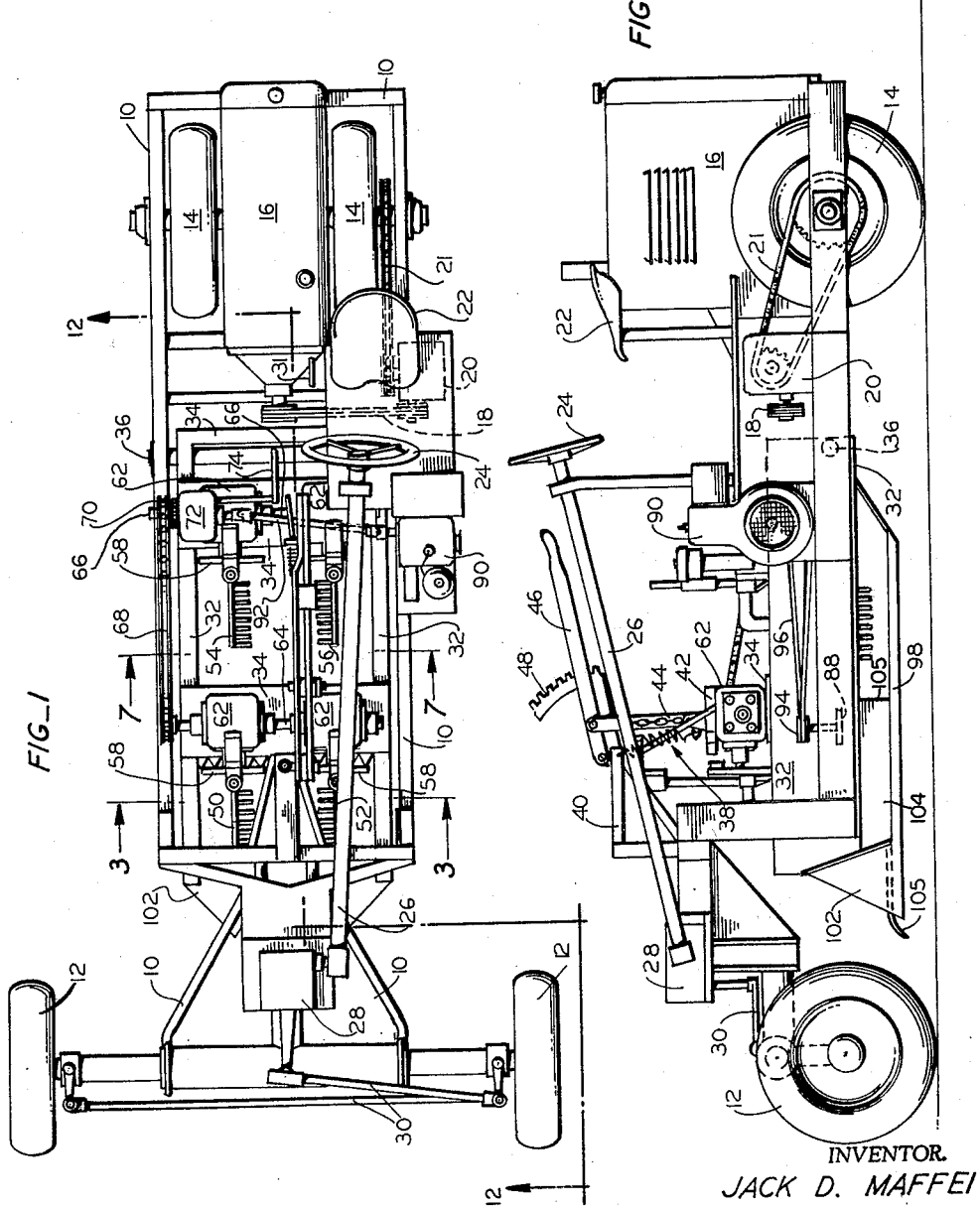
INVENTOR.
JACK D. MAFFEI
BY Naylor & Neal
ATTORNEYS

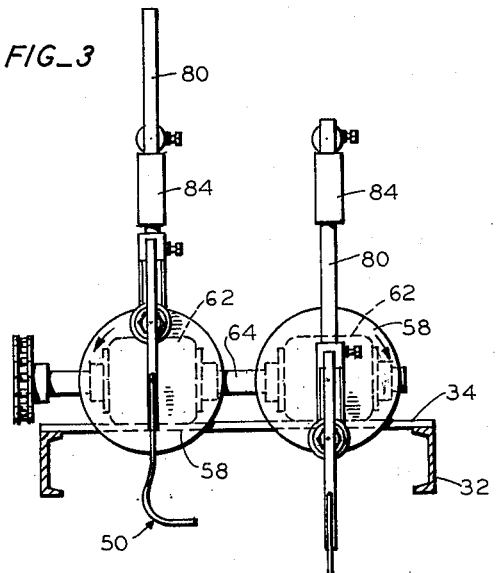
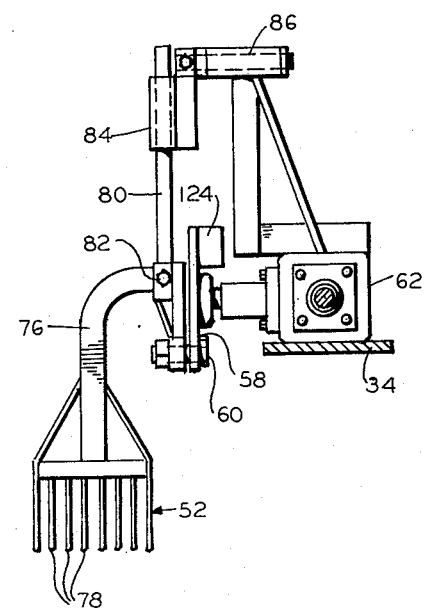
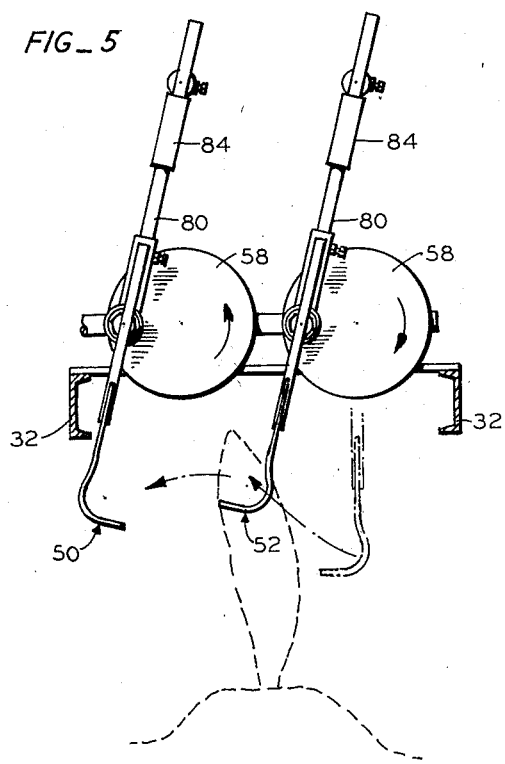

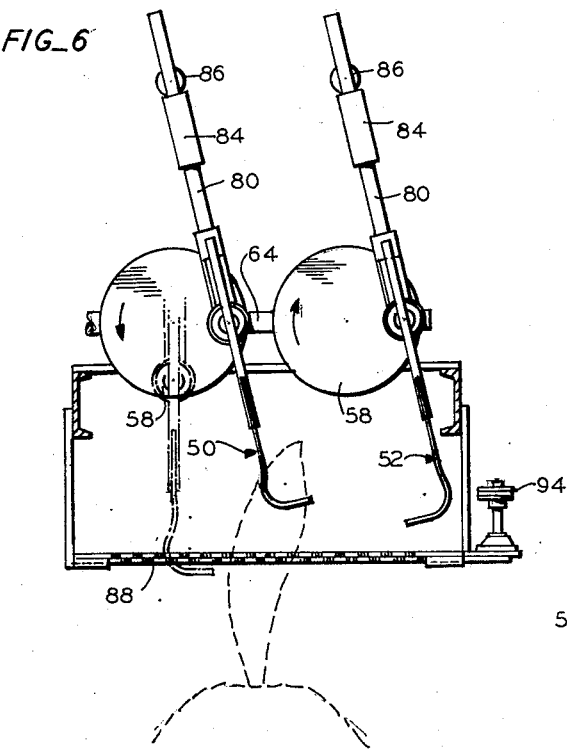
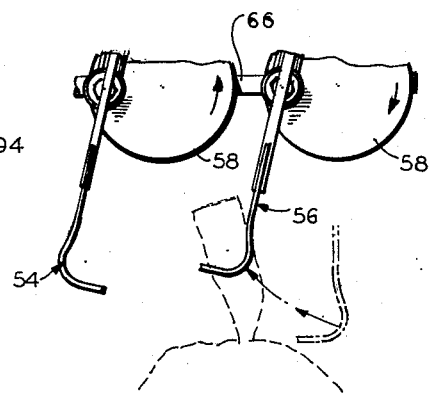
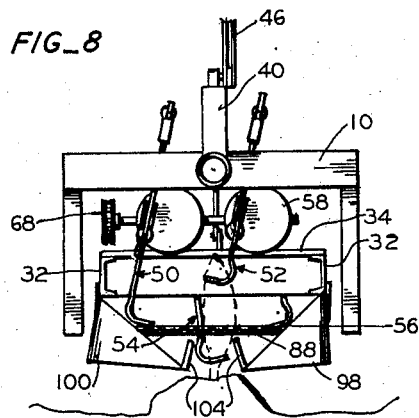

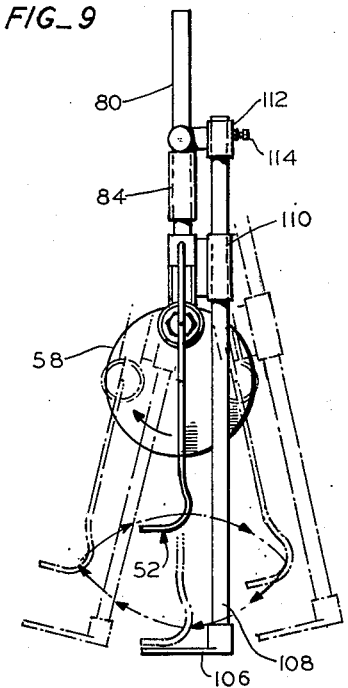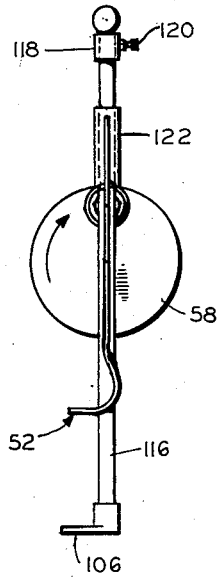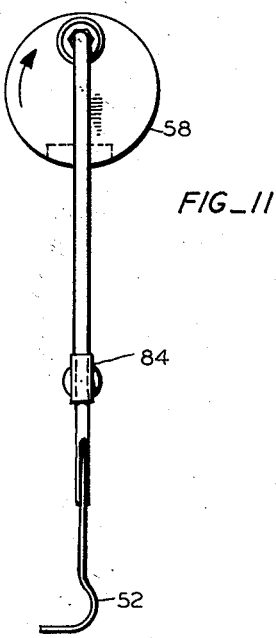

May 25, 1965
J. D. MAFFEI
3,184,902
BEAN POD STRIPPER
Filed Feb. 7, 1962
5 Sheets-Sheet 5
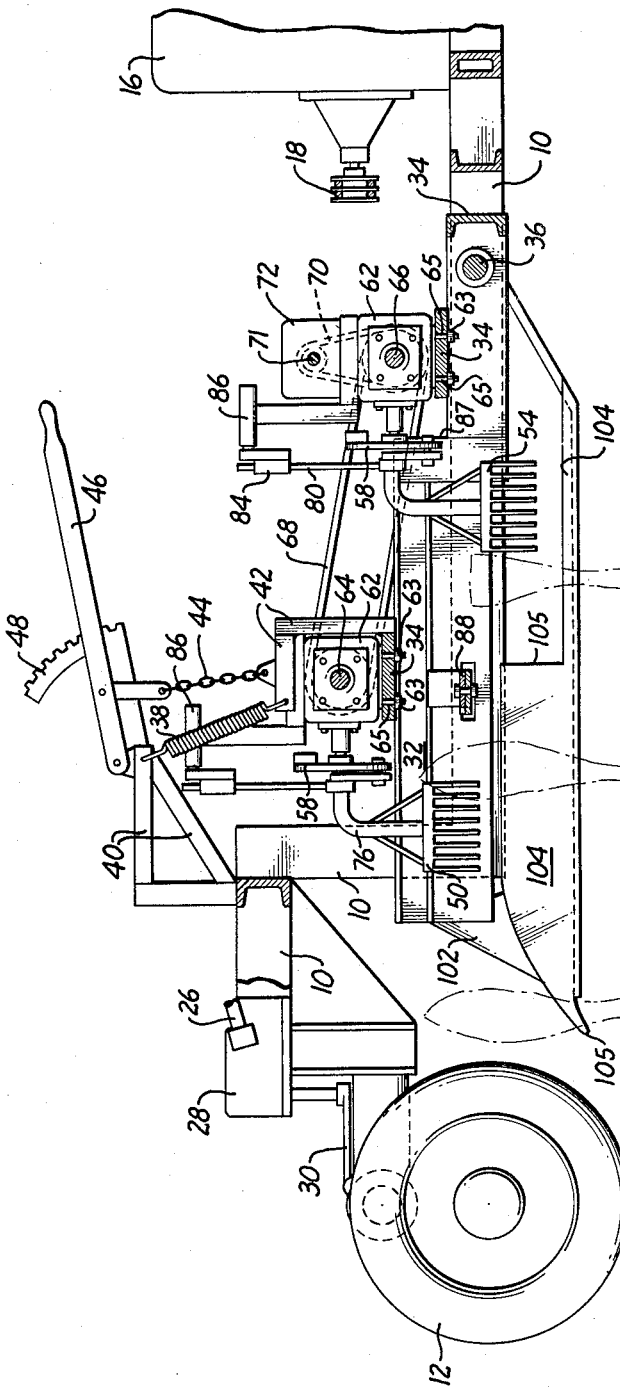
FIG_12
INVENTOR.
JACK D. MAFFEI
BY
*Naylor + Neal*
ATTORNEYS United States Patent Office 3,184,902
Patented May 25, 1965

3,184,902
BEAN POD STRIPPER
Jack D. Maffei, Gustine, Calif., assignor to L. D. Maffei Seed Co., Inc., Newman, Calif., a corporation of California
Filed Feb. 7, 1962, Ser. No. 171,760
17 Claims. (Cl. 56—19)

This invention relates to bean picking apparatus and more particularly to harvesting machinery for stripping bean pods from bean plants while leaving the plants in the ground.

In the harvesting and processing of bean crops such as bush baby limas and Ford Hook lima beans, it is very desirable to be able to harvest the entire crop in a large field as rapidly as possible so that the beans can be delivered at the proper maturity stage to frozen food processors. The proper time for harvesting these crops is sufficiently critical that with slow harvesting methods used heretofore, it has often happened that harvesting of a large field has been started at the proper time to obtain high grade beans for frozen food processors from a part of the field, but a large portion of the crop in the field is overripe by the time it can be harvested and hence brings a much lower price as off-grade frozen food produce. Sometimes these delays are so extensive that a part of the crop must be left in the field to be harvested subsequently as a dry bean crop, and such delays result in a tremendous reduction in the price which can be obtained for the crop.

Prior attempts have been made to speed up the green bean harvest or vining process as it is commonly called. Presently, mature bean plants are severed below ground level and put into windrows. The severed plants in their entirety are then passed through a viner which beats the plant and removes the beans from the pods. Serious problems have been encountered in these attempts, however, because the fibrous stocks in the lower parts of the plants and the roots of the plants clog the viner and limit the speed and capacity at which the viner can operate.

Accordingly, it is a principal object of this invention to provide harvesting apparatus for stripping bean pods from bean plants in the field as rapidly as possible so that large crops of beans can be picked at the peak of their maturity.

It is another principal object of the invention to provide such apparatus which will pick bean pods from bean plants of this kind while leaving the plants in the ground.

It is another object of the invention to provide such apparatus which will collect the pods while leaving the base skeleton of the plant in the ground.

It is another object of the invention to provide such apparatus which can be operated at high speed and capacity without impairing its efficiency in collecting the pods with substantially none of the base skeletons of the plants.

It is another object of the invention to provide such apparatus which will strip the plants in stages, first stripping the top portion of the plant, then removing the stripped part of the vine, and finally stripping the bottom remaining portion of the plant.

It is another object of the invention to provide such a harvesting machine which can be operated at high speed and in which the high speed moving parts are balanced as well as possible.

It is another object of the invention to provide such apparatus which is small and not excessively expensive to construct so that it may be stored easily between seasons and will justify the expense of its purchase even if it is used for this special application only.

It is another object of the invention to provide such apparatus in which the bean pod stripping elements can be adjusted readily to adapt the apparatus to the harvesting of crops of varying growth habit, as well as varying planted row spacings.

It is another object of the invention to provide such apparatus which may be adjusted easily for harvesting plants growing at different heights and which in its various positions of adjustment will be able to pass over obstacles on the ground without damaging itself.

It is another object of the invention to provide such a harvesting machine which is self-propelled and may be operated in the field by one man.

Other objects and advantages of the invention will become apparent from the following description read in conjunction with the attached drawings in which:

FIG. 1 is a top plan view of a harvesting machine constructed in accordance with the principles of this invention;

FIG. 2 is a view in side elevation of the apparatus of FIG. 1;

FIG. 3 is an interior elevational view on an enlarged scale of the apparatus of FIG. 1 taken along the plane indicated at 3—3 in FIG. 1;

FIG. 4 is a view in side elevation of the apparatus of FIG. 3;

FIGS. 5 and 6 are views of the apparatus of FIG. 1 similar to the view shown in FIG. 3 and illustrating the operation of the components shown in FIG. 3;

FIG. 7 is an interior elevational view on an enlarged scale taken along the plane indicated at 7—7 in FIG. 1;

FIG. 8 is a front elevational view of the apparatus of FIG. 1 with some of the parts of the apparatus omitted;

FIG. 9 illustrates on an enlarged scale an attachment which may be employed on the working elements of the apparatus of FIG. 1 to provide additional protection against the uprooting of bean plants;

FIG. 10 shows an alternative form of apparatus on an enlarged scale which is adapted for use in the same manner as the apparatus of FIG. 9;

FIG. 11 shows on an enlarged scale an alternative form of bean pod stripping apparatus for use in the harvester of FIG. 1; and FIG. 12 is a longitudinal sectional view on an enlarged scale of the apparatus of FIG. 1 taken on the plane indicated at 12—12 in FIG. 1.

Referring now in detail to the drawings and particularly to FIGS. 1 and 2, the harvester illustrated therein has a main chassis 10 having front and rear wheels 12 and 14 respectively with an internal combustion engine 16 mounted thereon and connected by belts 18 to a reduction gear box 20, with a chain 21 connecting the gear box 20 to the rear axle. A driver's station is provided adjacent to the rear of the chassis and has a driver's seat 22 and steering wheel 24 with the steering wheel 24 being connected by a steering shaft 26, gear box 28 and arms 30 to the front wheels 12 for steering of the harvester. The engine 16 is of a commercially available type having a built-in clutch with a clutch actuating lever 31.

An inner frame having side members 32 and cross members 34 is pivotally mounted on the chassis 10 by means of an axle 36 adjacent to the rear of the inner frame members 32, and the forward end of the inner frame is resiliently supported on the chassis 10 by a spring 38 connected between an angle bracket 40 on the chassis 10 and a brace member 42 on one of the cross members 34 of the inner frame. (See FIG. 2, member 42 is mounted centrally of the forward cross member 34 but is omitted in FIG. 1 to illustrate apparatus thereunder.) The forward end of the inner frame is further adjustably supported on the chassis 10 by a chain 44 connected to the brace 42 with the upper end of the chain 44 connected to a lever arm 46 provided with conventional rack adjusting means 48. In this manner, the minimum height above the ground of the forward end of the inner frame may be adjusted with the arm 46, and in any such position of adjustment, the forward end of the inner frame may move upwardly with the aid of spring 38 to clear rocks or similar obstacles on the ground.

Referring particularly to FIGS. 1 and 8, the inner frame carries a forward pair of beater forks 50 and 52 and a rearward pair of beater forks 54 and 56. As is best illustrated in FIGS. 1, 3 and 4, each beater fork is mounted eccentrically on a crank arm or disc 58 by means of an eccentric pivot pin 60, and the discs 58 are journalled in right angle drive units 62 which are mounted on the cross members 34 of the inner frame. The right angle drive members 62 are attached to the members 34 by bolts 63 which are received in elongated apertures 65 in the members 34 whereby the positions of the beater forks may be adjusted laterally of the harvesting machine to adapt the machine to the harvesting of plants of varying growth habit. The right angle drive units 62 for the forward and rearward pairs of beater forks are interconnected by keyed shafts 64 and 66 respectively which drive the forks of each pair in synchronization, and the shafts 64 and 66 are driven by chain and sprocket drives 68 and 70 respectively which are connected to a clutch 72 (see FIGS. 1 and 12) which drive the forward and rearward pairs of beater forks in synchronization. The drive 68 consists of a chain trained over sprockets on the shafts 64 and 66, and the drive 70 consists of a chain trained over a second sprocket on shaft 66 and a sprocket on the shaft 71 of clutch 72. The clutch 72 has a manipulating handle 74 positioned within reach of the operator's station on the harvester.

As can be seen most clearly from FIGS. 2, 3 and 4, each of the beater forks 50–56 has a stem portion 76 carrying a plurality of curved tines 78 depending therefrom with the stem portion 76 attached to the rotating disc 58 by the pivot pin 60. An alignment rod 80 is attached to each fork by a set screw 82 with the rod extending upwardly from the fork with its upper end received for sliding movement in a sleeve or pivot member 84, and the sleeve 84 is pivotally mounted in a bracket 86 on the inner frame so that the sleeve 84 pivots about a generally horizontal axis parallel to the axis of rotation of the disc 58 below it.

It will be seen from FIG. 8 that the elements supporting the forward and rearward pairs of beaters 50–56 are positioned at different horizontal planes of the inner frame (the inner frame being stepped up at 87 as seen in FIG. 12) so that the two pairs of beaters pass through upper and lower portions of the central zone of the harvesting machine through which the bean plants pass. A horizontal sickle cutter 88 is mounted on the inner frame intermediate of the centers of these two portions of the plant receiving zone of the machine so that the cutter 88 tops the bean plant to remove stems from the plant after these stems have been stripped of foliage and bean pods by the forward pair of beaters 50 and 52 and before the partially stripped plants pass to the rearward pair of beaters 54 and 56. In this manner, the already stripped stems cannot become tangled in the rearward pair of beaters thereby causing the rearward pair of beaters to uproot plants. The sickle cutter 88 is driven by a drive pulley 94 with a belt 96 entrained over the pulley 94 and a pulley (not shown) on the shaft 66 (see FIG. 2).

The beaters 50–56 and the cutter 88 are driven by a common auxiliary internal combustion engine 90 which is mounted on the chassis of the harvester adjacent to the driver's station. The auxiliary engine 90 is connected to the clutch 72 by a drive shaft 92 provided with suitable universal joints.

As illustrated in FIGS. 1, 2 and 8, a pair of bean pod collecting troughs 98 and 100 are mounted on the inner frame on opposite sides thereof and define the central bean plant receiving zone of the harvester with the forward ends of these troughs being provided with front skirts 102. The adjacent edges of the troughs 98 and 100 are provided with small upstanding inner walls 104 to keep beans in the trough from spilling back onto the ground, and it should be noted that the height of these walls 104 is reduced at 105 in FIG. 12 adjacent to the rearward pair of beaters to provide clearance for movement of the beaters at a closer level to the ground. The forward ends 105 of the walls (see FIGS. 2 and 8) project forwardly from the troughs 98 and 100 and are bent outwardly and downwardly to positions slightly below the level of the ground to pick up low trailing stems of the plants and guide them into the plant receiving zone. Discharge conveyors are connected to the troughs 98 and 100 to convey beans from the troughs to a suitable hopper, but these conveyors and hopper are not illustrated for the sake of clarity.

In operation of the apparatus shown in FIGS. 1–8, the harvester is driven along a row of bean plants with the front wheels 12 rolling between rows of plants. The bean bushes in the row are engaged by the guide members 105 at the forward end of the inner frame of the harvester and guided into the bean plant receiving zone centrally of the machine. The plants are there first engaged by the beaters 50 and 52 which are driven at relatively high speed. The beaters move along generally elliptical paths whose major axes are horizontal, and the beaters pull the bean pods and foliage from the plants while uprooting substantially none of the plants. In this regard, the movement of the beaters along their generally elliptical paths is quite efficient in removing pods from the plants while throwing the plants back and forth between them and while maintaining the tines of the beaters substantially free of accumulated foliage, etc. The foliage and bean pods removed from the plants by the forward beaters 50 and 52 are thrown into the troughs 98 and 100 respectively where they are conveyed to a suitable hopper. The plants as thus partially stripped of beans and foliage then pass through the horizontal cutter 88 which removes the stripped portion of the plants so that the plants then pass to the rearward pair of beaters 54 and 56 to have the bean pods and foliage on the lower portions of the plants removed. As the plant leaves the rearward pair of beaters 54 and 56, it retains only the heavy fibrous portion of the plant and root structure embedded in the ground. Operation of this apparatus has demonstrated that it is capable of picking baby limas and Ford Hook limas without uprooting more than half of one percent of the plants which it picks.

The bean pods collected in the troughs 98 and 100 may be separated by any suitable means such as a fan from the collected foliage, or the pods and foliage may be kept together as the food processor desires.

Referring to FIG. 9, an attachment is illustrated therein for use on the beaters where additional care is to be taken to avoid uprooting of the bean plants. This attachment comprises a horizontal rake 106 which is mounted at the lower end of a shaft 108. The shaft 108 extends through a sleeve 110 which is mounted on the neck portion of the beater, and the upper end of the shaft 108 is attached to the pivot member 84 by a sleeve 112 and lock nut 114. As will be apparent from the phantom outline positions of the elements in FIG. 9, rotation of the disc 58 causes the rake 106 to be swung back and forth into and out of the bean bushes as the beater 52 is reciprocated around its eliptical path. In this manner, uprooting of the bean plants is further prevented since the rake 106 engages the plant at a level below the level of the beater and holds the plant down during the portion of the beater's path when it is pulling the plant upwardly; where the rake is set at an elevation to enter the lower branches of the plant, it holds these lower branches down while the beater moves up, and where the rake is set at a lower level to engage the ground, it holds the plant's root system in the ground while the beater moves up.

The apparatus shown in FIG. 10 differs from the apparatus of FIG. 9 in that the rods 80 and 108 of FIG. 9 are consolidated into a single rod 116 which is rigidly attached at its upper end to a pivot member 118 similar to the pivot member 84 with a lock nut 120. The rake 106 is mounted on the lower end of the rod 116, and the beater fork 52 is provided with a sleeve 122 along its neck portion through which the rod 116 extends.

FIG. 11 illustrates an alternative form of apparatus which may be employed for reciprocating the forks 50–56 through their elliptical paths, this apparatus differing from the apparatus shown in FIGS. 3 and 4 in that the rotating disc 58 is mounted above the pivot member 84 instead of below it and is rotated in a direction opposite to its direction of rotation in FIG. 3.

It should be noted that the beaters 50–56 in this harvesting machine are driven at relatively high speed, and the harvester illustrated is designed to minimize the excessive vibration which could be caused by such high speed operation. The rotating crank arms or discs 58 are provided with counterbalances 124 (see FIG. 4) on the edges of the discs opposite to the pivot pins 60 to make each disc and fork combination dynamically balanced. Additionally, the synchronous drive between the two beaters of each pair insures that up and down vibration from each beater would be offset by similar vibration of the other beater of the pair, and the synchronous drive between the forward and rearward pairs of beaters so that the two pairs swing synchronously to opposite sides of the harvester provides for elimination of lateral vibration and swaying of the apparatus.

While a specific embodiment of the invention has been illustrated and described in detail herein, it is obvious that many modifications of the apparatus disclosed may be made without departing from the spirit and scope of the invention.

I claim:
1. A bean pod picking apparatus comprising
  (A) a chassis adapted to be moved along a row of bean plants and having
    (1) a front end and
    (2) a plant receiving zone extending longitudinally of said chassis through which a row of plants passes as said chassis is moved,
  (B) forward picker means mounted on said chassis adjacent said front end for picking bean pods from plants in an upper portion of said zone without picking bean pods from plants in a lower portion of said zone,
  (C) rearward picker means mounted on said chassis remote from said front end for picking bean pods from plants in said lower portion of said zone, and
  (D) cutter means mounted on said chassis between said forward and rearward picker means for topping bean plants along a generally horizontal plane which is positioned between the centers of said upper and lower portions of said zone.
2. A bean pod picking apparatus comprising
  (A) a frame adapted to be moved along a row of bean plants and having
    (1) a front end and
    (2) a plant receiving zone extending longitudinally of the frame through which a row of plants passes as said frame is moved,
  (B) a forward pair of picker forks for picking beans from an upper portion of said zone without picking beans from a lower portion of said zone mounted on said frame adjacent said front end with said pair having
    (1) two forks on opposite sides of said zone and
    (2) fork mounting and guide means interconnecting said forks and said frame for guiding said forks along paths of reciprocation with each fork moving through said zone during at least a portion of its path,
  (C) a rearward pair of picker forks for picking beans from a lower portion of said zone mounted on said frame remote from said front end with said pair having
    (1) two forks on opposite sides of said zone and
    (2) fork mounting and guide means interconnecting said forks and said frame for guiding said forks along paths of reciprocation with each fork moving through said zone during at least a portion of its path which is at a lower level than said portions of said paths of said forward forks,
  (D) cutter means mounted on said frame between said forward and rearward pairs of forks for topping bean plants in said zone along a generally horizontal plane at a level intermediate of the levels of said portions of said paths of said forward and rearward forks, and
  (E) drive means for driving said forks along said paths and driving said cutter means with the horizontal dimensions of said paths of said forks being substantially as great as the vertical dimensions of said paths.
3. The bean pod picking apparatus of claim 2 characterized further by the inclusion of a chassis having wheels thereon adapted to roll on the ground between rows of bean plants, and adjustable means interconnecting said chassis and said frame for supporting said frame on said chassis at adjustable heights above the ground.
4. The bean pod picking apparatus of claim 2 characterized further by the inclusion of plant guide means mounted on said frame below said pairs of forks for gathering bean plant foliage adjacent to said front of said frame and guiding it through said zone, a chassis having wheels thereon adapted to roll on the ground between rows of bean plants, means pivotally connecting said frame to said chassis about a generally horizontal axis spaced rearwardly of said frame from said rearward pair of forks, and adjustable spring support means interconnecting said chassis and said frame forwardly of said axis for resiliently supporting said frame on said chassis at a plurality of positions above the ground.
5. The bean pod picking apparatus of claim 2 in which each of said forks includes a plurality of generally parallel curved tines facing into said zone, and said mounting and guide means for each of said forks comprises means for guiding said fork along a closed path which, viewed in a vertical plane transverse of said zone has the general shape of an ellipse with its major axis inclined at a substantial angle to the vertical.
6. The bean pod picking apparatus of claim 5 characterized further in that said mounting and guide means for each of said forks includes a crank arm mounted on said frame for rotation about a generally horizontal axis above said fork and connected to said drive means to be rotated thereby with said crank arm connected eccentrically to said fork, a pivot member mounted on said frame for pivotal movement about a pivot axis parallel to and in generally the same vertical plane as said generally horizontal axis, and link means directly interconnecting said crank arm, said pivot member and said fork for moving said fork with said crank arm while maintaining alignment of said fork with said crank arm and said pivot member.
7. The apparatus of claim 6 in which said link means comprises an elongated rod rigidly connected to said fork and slidably connected to said pivot member for reciprocation in said pivot member responsive to rotation of said crank arm.
8. The apparatus of claim 6 in which said link means comprises an elongated rod rigidly connected to said pivot member and slidably connected to said fork for reciprocation with respect to said fork responsive to rotation of said crank arm.

9. The apparatus of claim 8 characterized further in that a bean bush holding foot is mounted on said rod below said fork at a position where said foot swings laterally into and out of said zone responsive to rotation of said crank arm.

10. The bean picking apparatus of claim 2 characterized further in that said mounting and guide means for each pair of said forks comprises:
  (A) a pair of discs mounted on said frame generally side by side over said zone for rotation about generally parallel and generally horizontal axes,
  (B) a stem portion of each of said forks of the pair rotatably connected to one of said discs eccentrically thereof for reciprocating said forks responsive to rotation of said discs,
  (C) a pivot member mounted on said frame above each of said discs for pivotal movement about an axis parallel to axes,
  (D) link means interconnecting said pivot members and the stems of said forks for maintaining said forks generally perpendicular to said pivot axes while permitting said forks to move toward and away from said pivot members as said discs rotate, and
  (E) synchronizing means for rotating said discs in opposite directions about their respective axes with the eccentric connections between one of said discs and its fork positioned at the top of the disc when the eccentric connection between the other disc and its fork is positioned at the bottom of the disc.

11. The apparatus of claim 10 characterized further by the inclusion of counterbalancing means on each of said discs for providing balanced rotation of said disc about its axis with its fork thereon.

12. The apparatus of claim 10 characterized further in that said drive means includes second synchronizing means interconnecting the synchronizing means of both pairs of forks so that when the eccentric connections of the discs of one pair are positioned toward one side of said frame from the axes of the respective discs, the eccentric connections on the other pair of discs are positioned toward the other side of the frame from the axes of their respective discs.

13. In a bean picking machine for stripping beans from bean plants while leaving the bean plants in the ground where said machine includes a frame movable along a row of bean plants and defining an elongated zone adjacent to the ground through which a row of bean plants passes as the frame is moved along the row, the improved means for removing bean pods from plants in said zone which comprises: a crank arm mounted on said frame above said zone for rotation about a generally horizontal axis extending longitudinally of said zone, a beater fork having a neck portion and a plurality of tines depending from said neck portion and extending into said zone, means connecting said neck portion of said fork directly to said crank arm eccentrically of said axis of rotation for effecting reciprocation of said fork in said zone responsive to rotation of said crank arm, and connecting means pivotally connecting said neck portion of said fork to a fixed pivotal axis on said frame in a generally vertical plane through said crank arm axis with said connecting means slidably engaging said neck portion for holding said neck portion generally perpendicular to said fixed pivotal axis while permitting said neck portion to slide toward and away from said fixed pivotal axis and guiding said tines around a closed path with the horizontal dimension of said path being substantially as great as the vertical dimension of said path.

14. In a bean picking machine for stripping beans from bean plants while leaving the bean plants in the ground where said machine includes a frame movable along a row of bean plants and defining an elongated zone adjacent to the ground through which a row of bean plants passes as the frame is moved along the row, the improved means for removing bean pods from plants in said zone which comprises: a crank arm mounted on said frame above said zone for rotation about a generally horizontal axis extending longitudinally of said zone, a beater fork having a neck portion and a plurality of tines depending from said neck portion and extending into said zone, means pivotally connecting said neck portion of said fork directly to said crank arm eccentrically of said axis of rotation for effecting reciprocation of said fork in said zone responsive to rotation of said crank arm, and link means interconnecting said fork and said frame for maintaining said tines of said fork below said stem as said crank arm rotates, and guiding said tines around a closed path with the horizontal dimension of said path being substantially as great as the vertical dimension of the path, said link means comprising a pivot member mounted on said frame for pivotal movement about a pivot axis which is parallel to and lies in a generally vertical plane through the axis of rotation of said crank arm, and a rod connecting said pivot member to said neck portion of said fork for maintaining said fork generally perpendicular to said pivot axis while permitting said fork to move toward and away from said pivot axis as said crank arm rotates, and with said pivot member positioned above said crank arm and rigidly connected to said rod, and with sleeve means provided on said fork with said rod extending through said sleeve means.

15. The apparatus of claim 14 in which said rod extends from said pivot member through said sleeve means to a point below said fork, and a bean plant holding foot is mounted on the lower end of said rod.

16. In a bean picking machine for stripping bean pods from bean plants while leaving the bean plants in the ground where the machine includes a frame movable along a row of bean plants and defining an elongated zone adjacent to the ground through which a row of bean plants passes as the frame is moved along the row, the improved means for removing bean pods from plants in said zone which comprises: a pair of drive units adjustably mounted on said frame above said zone for lateral adjustment with respect to said zone, a pair of crank arms mounted on said drive units to be driven thereby in rotation about generally horizontal and generally parallel axes extending longitudinally of said zone and spaced on opposite sides of a median line through said zone, a pair of beater forks each having a neck portion and a plurality of tines depending from said neck portion and extending into said zone, means connecting the neck portion of one of said forks to each of said crank arms eccentrically of said crank arm for effecting reciprocation of said fork in said zone responsive to rotation of said crank arm, link means interconnecting each of said forks and the one of said drive units on which said fork is mounted for maintaining said tines of said fork below its stem as said crank arm rotates, and synchronizing drive means interconnecting said drive units for driving said units in synchronization in all of the relative positions of lateral adjustment of said drive units on said frame.

17. In a bean picking machine for stripping beans from bean plants while leaving the bean plants in the ground where said machine includes a frame movable along a row of bean plants and defining an elongated zone adjacent to the ground through which a row of bean plants passes as the frame is moved along the row, the improved means for removing bean pods from plants in said zone which comprises: a crank arm mounted on said frame above said zone for rotation about a generally horizontal axis extending longitudinally of said zone, a beater fork having a neck portion and a plurality of tines depending from said neck portion and extending into said zone, means pivotally connecting said neck portion of said fork directly to said crank arm eccentrically of said axis of rotation for effecting reciprocation of said fork in said zone responsive to rotation of said crank arm, and link means interconnecting said fork and said frame for maintaining said tines of said fork below said stem as said crank arm rotates and guiding said tines around a closed path with the horizontal dimension of said path being substantially as great as the vertical dimension of the path, said link means comprising a pivot member mounted on said frame for pivotal movement about a pivot axis which is parallel to and lies in a generally vertical plane through the axis of rotation of said crank arm, and a rod connecting said pivot member to said neck portion of said fork for maintaining said fork generally perpendicular to said pivot axis while permitting said fork to move toward and away from said pivot axis as said crank arm rotates and with said pivot member positioned above said crank arm and slidably connected to said rod, and with said rod rigidly connected to said neck portion of said fork.

References Cited by the Examiner
UNITED STATES PATENTS

| | | | |
|---|---|---|---|
| 2,587,553 | 2/52 | Ward | 56—19 |
| 2,641,888 | 6/53 | Grether | 56—19 |
| 2,675,663 | 4/54 | Ward | 56—19 X |

T. GRAHAM CRAVER, *Primary Examiner.*

ALDRICH F. MEDBERY, ARNOLD RUEGG,
*Examiners.*